US007761519B2

(12) United States Patent  
Schultz

(10) Patent No.: US 7,761,519 B2
(45) Date of Patent: Jul. 20, 2010

(54) METHOD, SYSTEM, AND COMPUTER PROGRAM PRODUCT FOR DISPLAYING MESSAGE GENEALOGY

(75) Inventor: Dale M. Schultz, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 10/915,907

(22) Filed: Aug. 11, 2004

(65) Prior Publication Data
US 2006/0036691 A1    Feb. 16, 2006

(51) Int. Cl.
G06F 15/16    (2006.01)
(52) U.S. Cl. .................. 709/206; 709/245; 709/238
(58) Field of Classification Search ............. 709/206, 709/238, 245
See application file for complete search history.

(56) References Cited

U.S. PATENT DOCUMENTS

| | | | |
|---|---|---|---|
| 5,634,005 A | 5/1997 | Matsuo | |
| 5,715,466 A | 2/1998 | Flanagan et al. | |
| 5,784,001 A * | 7/1998 | Deluca et al. | 340/7.56 |
| 5,884,246 A | 3/1999 | Boucher et al. | |
| 5,905,863 A | 5/1999 | Knowles et al. | |
| 6,631,398 B1 | 10/2003 | Klein | |
| 6,701,346 B1 | 3/2004 | Klein | |
| 6,832,244 B1 * | 12/2004 | Raghunandan | 709/206 |
| 7,054,906 B2 * | 5/2006 | Levosky | 709/206 |
| 7,313,587 B1 * | 12/2007 | Dharmarajan | 709/201 |
| 2002/0178228 A1 | 11/2002 | Goldberg | |
| 2003/0074462 A1 * | 4/2003 | Grove | 709/230 |

FOREIGN PATENT DOCUMENTS

JP    2001337894    12/2001

* cited by examiner

*Primary Examiner*—Dohm Chankong
(74) *Attorney, Agent, or Firm*—Ayla Lari; Hoffman Warnick LLC

(57) ABSTRACT

A method, system, and computer program product for displaying message genealogy in the language of the user interface of an email recipient using a normalized set of subject prefix codes. The method comprises: sending an email to a recipient, wherein the email has an original subject; sending a normalized code corresponding to a subject prefix for the email to the recipient; receiving and decoding at the recipient the normalized code to provide a subject prefix in a language of the user interface of the recipient; and displaying the subject prefix in the language of the user interface of the recipient adjacent the original subject of the email.

12 Claims, 4 Drawing Sheets

| Operation | Subject of email | Content of proposed email header | Subject as displayed to recipient | Comment |
|---|---|---|---|---|
| Original email sent from 1 to 2 | ABC | none | ABC | Current behavior |
| 2 replies to 1 | ABC | R | Re: ABC | The R indicates that this is a reply and "Re:" is displayed prepended onto the actual subject |
| 1 replies to 2 | ABC | R | Ant: ABC | The R indicates that this is a reply and "Ant:" is displayed prepended onto the actual subject |
| 2 forwards the email to 3 | ABC | F | 회송: ABC | The F indicates that this is a forwarded mail and "회송:" is displayed prepended onto actual subject |

| Operation | Subject of email | Content of proposed email header | Subject as displayed to recipient | Comment |
|---|---|---|---|---|
| Original email sent from 1 to 2 | ABC | none | ABC | Current behavior |
| 2 replies to 1 | ABC | R | Re: ABC | The R indicates that this is a reply and "Re:" is displayed prepended onto the actual subject |
| 1 replies to 2 | ABC | R | Ant: ABC | The R indicates that this is a reply and "Ant:" is displayed prepended onto the actual subject |
| 2 forwards the email to 3 | ABC | F | 회송: ABC | The F indicates that this is a forwarded mail and "회송:" is displayed prepended onto actual subject |

FIG. 3

METHOD, SYSTEM, AND COMPUTER PROGRAM PRODUCT FOR DISPLAYING MESSAGE GENEALOGY

BACKGROUND OF THE INVENTION

1. Field of the Invention

The present invention relates generally to electronic mail (email). More specifically, the present invention provides a method, system, and computer program product for displaying message genealogy in the language of the user interface of an email recipient using a normalized set of subject prefix codes.

2. Background Art

Currently, it is common for email based messaging systems to add a prefix to the subject of a communication to indicate the recent genealogy of the message. For example, when replying to a message with the subject "ABC," a new subject "Re: ABC" is generated to indicate to the email recipient that this is a reply to an email titled "ABC." Another common prefix indicates a forwarded message as in "Fw: ABC."

There are several problems associated with current email prefix methodologies including, for example, the accumulation of prefixes and the use of prefixes in natural languages other than those with which the recipient is familiar. Both of these problems can in turn cause noise in the subject line, prevent the subject line from being understood by the recipient, and prevent messages from being easily sorted by subject.

When email is repeatedly exchanged between multiple parties, the prefixes naturally start to duplicate and can become a nuisance. For example, after a plurality of exchanges, an email with the subject "ABC" may appear as "Re: Re: Fw: Re: ABC" in the subject line. One existing solution to this problem, provided by Microsoft Outlook Express, is to strip off any existing prefixes up to and including the first colon that appears in the first 5 characters of the subject. This solution, however, is inadequate under two conditions. The first condition occurs when one of the parties exchanging email is using a non-compliant email program that is not configured to strip off existing prefixes. In this case, the prefixes are not stripped off in the desired manner. The second condition is encountered when one of the email programs does not use a colon at the end of a prefix. This sometimes happens with email clients that have been translated into languages other than English, thus making a colon inappropriate. This also causes the stripping method to fail.

A second known solution for removing existing prefixes is to remove prefixes that are known to the email client software. However, this is usually limited to the prefixes for the same language version only, because it is difficult to maintain tables of all the translations and almost impossible to maintain tables of all the translations for all other email products. For example, an email exchange between English and German participants may look like this: "Re: Ant: Re: Ant: Fw: ABC." To this extent, the prefix "Re:" would not be recognized by the German version of the email program because the German version would be looking for the prefix "Ant:."

Another existing problem is that it is currently very simple to introduce an incorrect subject prefix (e.g., "Re:") into the subject line of an email in an attempt to fool the recipient into thinking that the email is a reply to a previous email. This is commonly done in unsolicited "spam" emails to make the recipient believe that the email is the result of an earlier email discussion, thereby increasing the likelihood that the recipient will open and possibly read the message.

In view of the foregoing, there exists a need for a method, system, and computer program product for displaying message genealogy in the language of the user interface of an email recipient using a normalized set of subject prefix codes.

SUMMARY OF THE INVENTION

In general, the present invention provides a method, system, and computer program product for displaying message genealogy in the language of the user interface of an email recipient using a normalized set of subject prefix codes. In particular, a set of normalized codes is provided to represent the required subject prefixes (e.g., Reply (Re:), Forward (Fw:), "none," etc.). The normalized code corresponding to a required subject prefix is sent with an email as a separate entity (e.g., as part of an email header). Upon receipt of the email, the correct localized subject prefix is looked up based on the normalized code and displayed in the language of the user interface of the recipient in conjunction with the original subject. Thus, when the email is displayed to the recipient, the subject line of the email contains a single subject prefix in the language of the user interface of the recipient and the original subject. The language in which the subject prefix is displayed can furthermore be chosen by the recipient.

A first aspect of the present invention provides a method for displaying a message genealogy of electronic mail (email), comprising: sending an email to a recipient, wherein the email has an original subject; sending a normalized code corresponding to a subject prefix for the email to the recipient; receiving and decoding at the recipient the normalized code to provide a subject prefix in a language of a user interface of the recipient; and displaying the subject prefix in the language of the user interface of the recipient adjacent the original subject of the email.

A second aspect of the present invention provides a system for displaying a message genealogy of electronic mail, comprising: a system for sending an email to a recipient, wherein the email has a subject; a system for sending a normalized code corresponding to a subject prefix for the email to the recipient; a system for receiving and decoding at the recipient the normalized code to provide a subject prefix in a language of a user interface of the recipient; and a system for displaying the subject prefix in the language of the user interface of the recipient adjacent the subject of the email.

A third aspect of the present invention provides a program product stored on a recordable medium for displaying a message genealogy of electronic mail, which when executed comprises: program code for sending an email to a recipient, wherein the email has a subject; program code for sending a normalized code corresponding to a subject prefix for the email to the recipient; program code for receiving and decoding at the recipient the normalized code to provide a subject prefix in a language of a user interface of the recipient; and program code for displaying the subject prefix in the language of the user interface of the recipient adjacent the subject of the email.

A fourth aspect of the present invention provides a system for deploying an application for displaying a message genealogy of electronic mail, comprising: a computer infrastructure being operable to: send an email to a recipient, wherein the email has a subject; send a normalized code corresponding to a subject prefix for the email to the recipient; receive and decode at the recipient the normalized code to provide a subject prefix in a language of a user interface of the recipient; and display the subject prefix in the language of the user interface of the recipient adjacent the subject of the email.

A fifth aspect of the present invention provides computer software embodied in a propagated signal for displaying a message genealogy of electronic mail, the computer software comprising instructions to cause a computer system to perform the following functions: send an email to a recipient, wherein the email has a subject; send a normalized code corresponding to a subject prefix for the email to the recipient; receive and decode at the recipient the normalized code to provide a subject prefix in a language of a user interface of the recipient; and display the subject prefix in the language of the user interface of the recipient adjacent the subject of the email.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a table illustrating an application of the present invention for an email exchanged among three different email clients.

Figure 1:
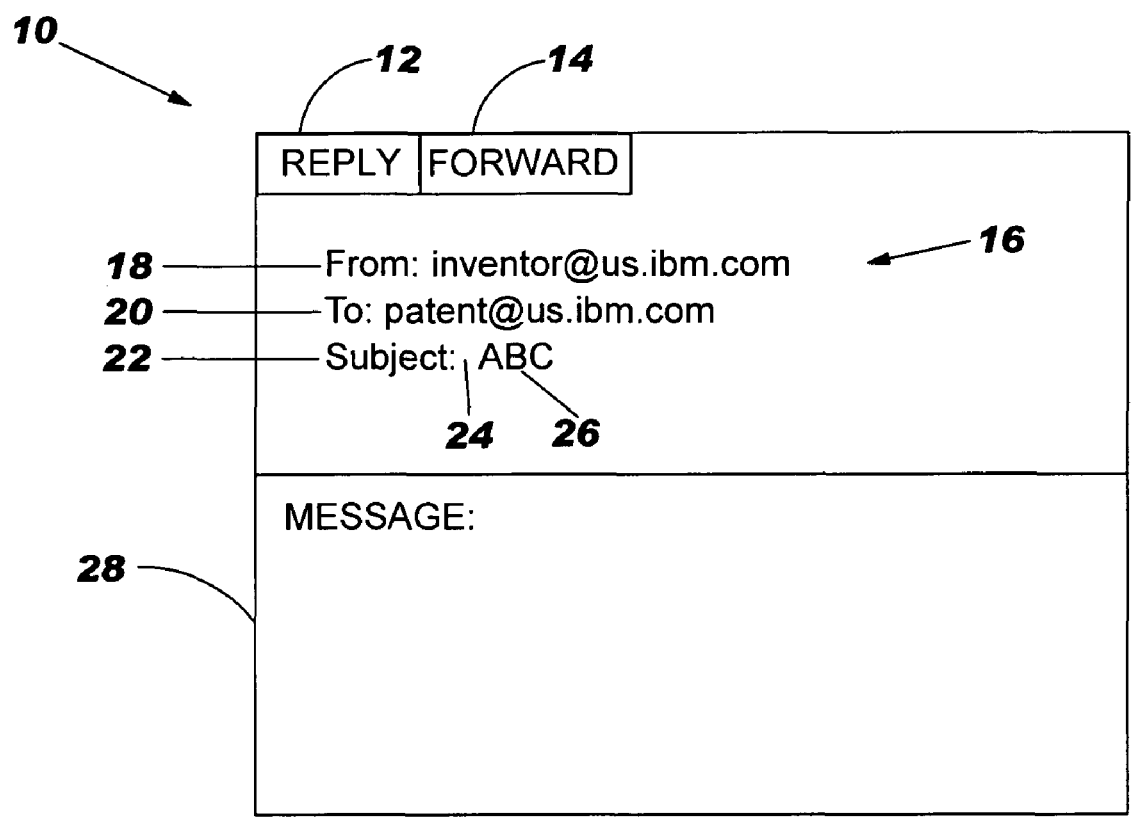
FIG. 1 depicts an illustrative email.

The drawings are merely schematic representations, not intended to portray specific parameters of the invention, and are not necessarily to scale. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for displaying message genealogy in the language of the user interface of an email recipient using a normalized set of subject prefix codes. In particular, a set of normalized codes is used to represent the required subject prefixes (e.g., Reply (Re:), Forward (Fw:), "none," etc.). The normalized code corresponding to a required subject prefix is sent with an email as a separate entity (e.g., as part of an email header). Upon receipt of the email, the correct localized subject prefix is looked up based on the normalized code and displayed in the language of the user interface of the recipient in conjunction with the original subject. Thus, when the email is displayed to the recipient, the subject line of the email contains a single subject prefix in the language of the user interface of the recipient and the original subject. The language in which the subject prefix is displayed can furthermore be chosen by the recipient.

An illustrative email 10 is depicted in FIG. 1. The email 10 generally includes a Reply button 12 for replying to the sender of the email 10, and a Forward button 14 for forwarding the email 10 to another party. The email 10 also includes an informational section 16 that contains the name or email address 18 of the sender of the email 10, the name or email address 20 of the recipient of the email 10, and a subject line 22 containing the subject 26 of the email 10 and a subject prefix 24 (e.g., Reply (Re:), Forward (Fw:), none, etc.). In this example, the subject prefix 24 comprises "none" (i.e., no subject prefix is shown). This is typically the case for an original email sent to a recipient. The email 10 also includes a message section 28 that contains the body of the email 10.

Figure 2:
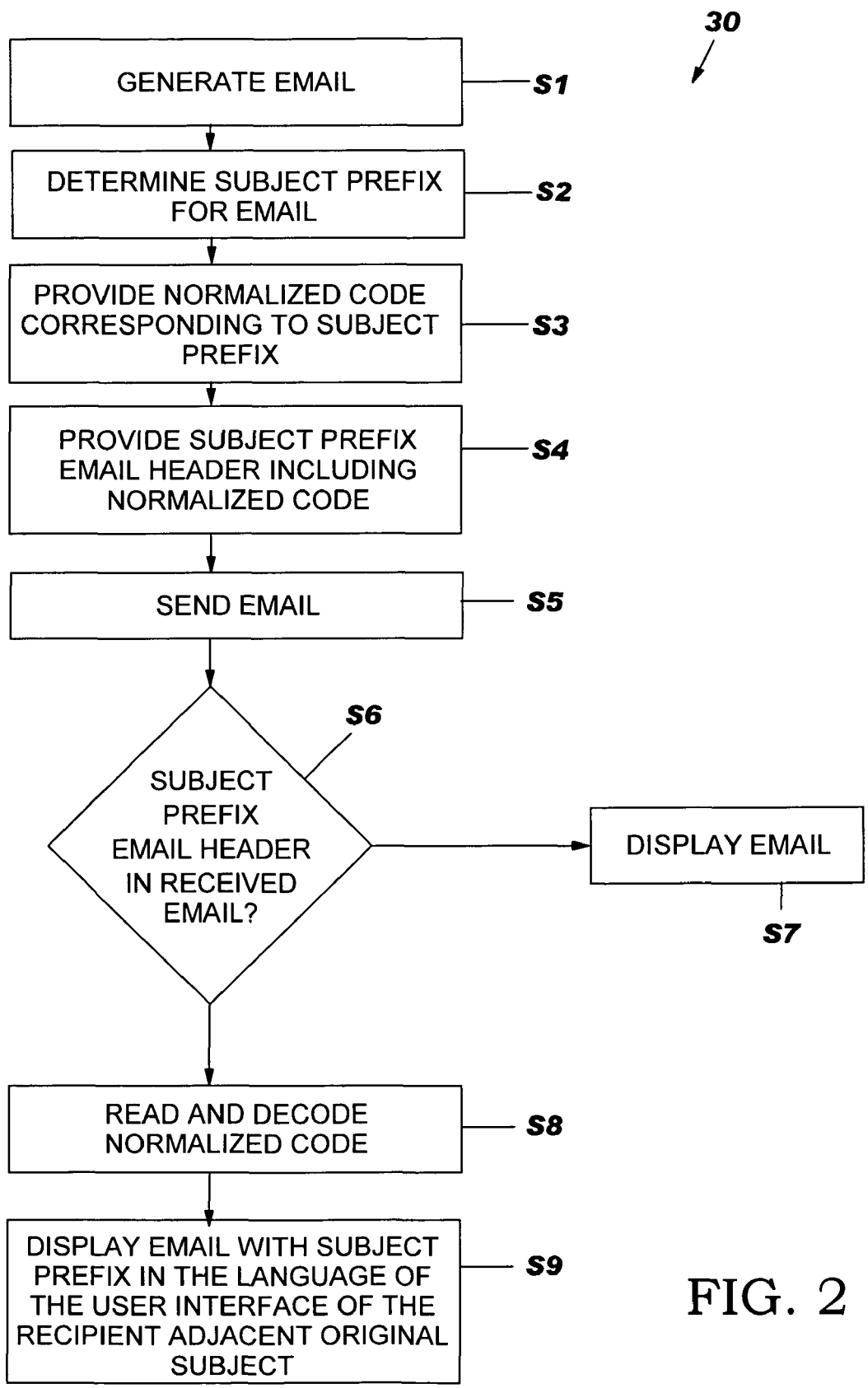
FIG. 2 depicts a flow diagram illustrating the process flow of a method in accordance with the present invention.

A flow diagram 30 illustrating the process flow of a method in accordance with the present invention is shown in FIG. 2. In step S1, an email is generated. The email can be an original email, a reply email, a forwarded email, etc. In step S2, the subject prefix for the email is determined. In step S3, a normalized code corresponding to the determined subject prefix is provided. The normalized code can comprise, for example, the number "1" for a reply email, the number "2" for a forwarded email, etc. As another example, the letter "R" could be used for a reply email, the letter "F" for a forwarded email, etc. As will be apparent to one skilled in the art, any suitable unique set of normalized codes could be used in the practice of the present invention. In step S4, the normalized code is provided in a subject prefix header of the email. For example, an RFC822 compliant email header (e.g., X-SubjectPrefix, X-MailHistory, etc.) including the appropriate normalized code could be added/used to indicate what type of subject prefix should be displayed in conjunction with the original subject of the email. In the case of an original email that does not require a subject prefix, no such subject prefix header is required—although a subject prefix header designating a normalized code corresponding to an original email could be used, if desired. In this case, using the above examples, the number "0" or the letter "N" could be used as the normalized code for an original email. In step S5, the email is sent to one or more recipients. In step S6, the received email is examined to determine if a subject prefix header containing a normalized code is present. In step S7, if a subject prefix header is not present, the email is displayed with no subject prefix. In step S8, if a subject prefix header is found, the normalized code in the subject prefix header is read and decoded to provide the subject prefix in the language of the user interface of the recipient. In step S9, the received email is displayed with the subject prefix in the language of the user interface of the recipient adjacent the original subject of the email.

As an example of a first embodiment of this process, the following email headers could be used:
X-MailHistory:1
(Mail is a reply Re:)
X-MailHistory:2
(Mail has been forwarded Fw:)

At the recipient, the following steps can be used to display the subject prefix as specified in the email header:
(A) Look for the special email header, if none found, do nothing (this indicates that the email is an original email—no subject prefix is necessary);
(B) If the special email header is found, read its value, for example '1';
(C) Lookup language appropriate subject prefix based on the value obtained in step (B) (e.g., "Aw:" for German); and
(D) Display language appropriate subject prefix adjacent (e.g., to the left) of the original email subject.

In another embodiment of this process, the following email headers could be used:
X-MailHistory:Re:
(Mail is a reply Re:)
X-MailHistory:Fw:
(Mail has been forwarded Fw:)

This embodiment could be used in an implementation in which the genealogy prefix is also sent in the email header. This allows email clients that are compliant to remove the subject prefix from the subject and replace it with the appropriate language version subject prefix. Non-compliant legacy email clients do nothing and display the subject prefix as happens in the absence of this invention with the subject prefix in the language of the user interface of the sender.

At the recipient, the following steps can be used to display the subject prefix as specified in the email header:

(A) Look for the special mail header, if none found, do nothing (this indicates that the email is an original email—no subject prefix is necessary);
(B) If the special mail header is found, read its value, for example 'Re:';
(C) Remove value obtained in step (B) from the email subject;
(D) Lookup language appropriate subject prefix based on the value obtained in step (B), (e.g., "Aw:" for German); and
(E) Display language appropriate subject prefix adjacent (e.g., to the left) of the original email subject.

The present invention will now be described using an example involving three email clients that have exchanged an email with the original subject of "ABC," wherein client 1 is English, client 2 is German, and client 3 is Korean. This example is illustrated in table 40 in FIG. 3. Initially, as detailed in row 42 of table 40, an original email was sent from client 1 (English) to client 2 (German). Since an original email was sent, and no subject prefix was necessary, the email header did not include a normalized code. The subject line as displayed to client 2 (German) included only the original subject "ABC" of the email. After receipt of the email, client 2 (German) sent a reply back to client 1 (English). This is detailed in row 44 of table 40. In this case, the email header included the normalized code "R" indicating that the email was a reply to a previous email. Upon receipt of the reply email, client 1 (English) read and decoded the normalized code "R" in the email header and prepended the corresponding (English) subject prefix of "Re:" onto the original subject "ABC" of the message, resulting in a displayed subject line of "Re: ABC." Client 1 (English) subsequently replied back to client 2 (German). This is detailed in row 46 of table 40. In this case, the email header again included the normalized code "R" indicating that the email was a reply to a previous email. Upon receipt of the reply email, client 2 (German) read and decoded the normalized code "R" in the email header and prepended the corresponding (German) subject prefix of "Ant:" onto the original subject "ABC" of the message, resulting in a displayed subject line of "Ant: ABC." In the final email of this example, Client 2 (German) subsequently forwarded the email to client 3 (Korean). This is detailed in row 48 of table 40. In this case, the email header included the normalized code "F" indicating that the email was a forwarded email. Upon receipt of the forwarded email, client 3 (Korean) read and decoded the normalized code "F" in the email header and prepended the corresponding (Korean) subject prefix of "회송" onto the original subject "ABC" of the message, resulting in a displayed subject line of "회송: ABC."

As can be seen from table 40 in FIG. 3, the subject of the email was always displayed correctly as "ABC" with the correct subject prefix in the correct language of the user interface of the recipient. This was not possible using the techniques of the prior art.

The normalized codes described above are illustrative only and are not intended to be limiting. In addition to normalized codes for "Reply" and "Forward" described above, the present invention can be applied to calendaring work flow messages with normalized codes for "Invitation," "Accepted," "Declined," "Countered," etc.

By placing the normalized codes for subject prefixes in the email header instead of in the original subject itself, it is much more difficult for "Spammers" and the like to create the illusion that an email is a reply to a previous mail when it is in fact an original mail. Use of the present invention would require the provision/use of specially written email software to send a spurious email header containing the required normalized codes.

The present invention should not be limited to textual prefixes on the subject. The indication of the message genealogy could also be expressed by an image, color, sound, etc. Once the message indicator has been separated form the message subject, the information could be expressed in many different ways.

Figure 4:
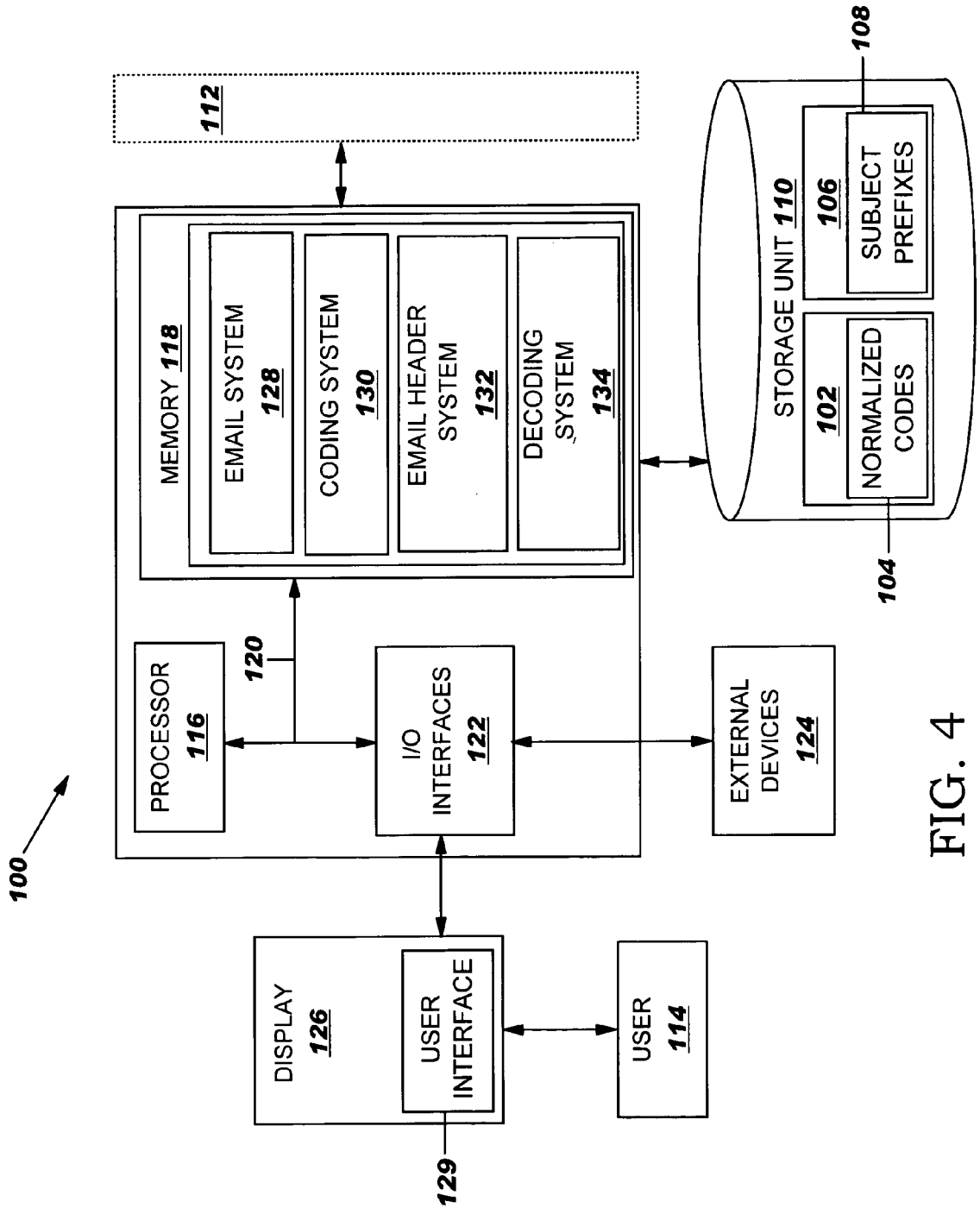
FIG. 4 depicts a computer system for implementing the method of the present invention.

Referring now to FIG. 4, there is illustrated a computer system 100 for displaying message genealogy in the language of the user interface of an email recipient using a normalized set of subject prefix codes in accordance with the present invention. Computer system 100 is intended to represent any type of computerized system capable of implementing the methods of the present invention. For example, computer system 100 may comprise a desktop computer, laptop, workstation, server, PDA, cellular phone, pager, etc.

A look-up table 102 containing normalized codes 104 and a look-up table 106 containing subject prefixes 108 can be stored locally to computer system 100, for example, in storage unit 110, and/or may be provided to computer system 100 over a network 112. The look-up table 102 can be used to provide a normalized code 104 that will be included in a subject prefix header of an email to be sent based on the email type (e.g., a reply email, a forwarded email, etc.). Analogously, the look-up table 106 can be used to decode a subject prefix header in a received email to provide the subject prefix 108 that will be displayed adjacent the original subject of the email. Look-up table 106 can include subject prefixes 108 in at least one language that corresponds to the user interface language or can be selected by a user 114. Other techniques for providing and decoding the normalized codes are also possible.

Storage unit 110 can be any system capable of providing storage for data and information under the present invention. As such, storage unit 110 may reside at a single physical location, comprising one or more types of data storage, or may be distributed across a plurality of physical systems in various forms. In another embodiment, storage unit 110 may be distributed across, for example, a local area network (LAN), wide area network (WAN) or a storage area network (SAN) (not shown). Network 112 is intended to represent any type of network over which data can be transmitted. For example, network 112 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 100 generally includes a processor 116, memory 118, bus 120, input/output (I/O) interfaces 122 and external devices/resources 124. Processor 116 may comprise a single processing unit, or may be distributed across one or more processing units in one or more locations, e.g., on a client and server. Memory 118 may comprise any known type of data storage and/or transmission media, including magnetic media, optical media, random access memory (RAM), read-only memory (ROM), etc. Moreover, similar to processor 116, memory 118 may reside at a single physical location, comprising one or more types of data storage, or be distributed across a plurality of physical systems in various forms.

I/O interfaces 122 may comprise any system for exchanging information to/from an external source. External devices/resources 124 may comprise any known type of external device, including speakers, a CRT, LED screen, handheld device, keyboard, mouse, voice recognition system, speech output system, printer, monitor/display (e.g., display 126), facsimile, pager, etc.

Bus 120 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Shown in memory 118 is email system 128, which can be any known or later developed system/program capable of providing email messaging capabilities. Email system 128 provides a user interface 129 for displaying emails to user 114 on display 126. Also shown in memory 118 is coding system 130, email header system 132, and decoding system 134, which may be provided as computer program products. The coding system 130 provides a normalized code corresponding to a subject prefix of an email to be sent (e.g., using look-up table 102). Email header system 132 provides a subject prefix email header including the normalized code that will be sent with the email by the email system 128. Upon receipt of an email by the email system 128, the decoding system 134 checks for a subject prefix header and, if present, reads and decodes the normalized code in the subject prefix header (e.g., using look-up table 106) to provide the subject prefix in a language corresponding to the language of the user interface 129 or chosen by user 114. The email system 128 then displays the subject prefix adjacent the original subject in the subject line of the email on the display 126.

It should be appreciated that the teachings of the present invention could be offered as a business method on a subscription or fee basis. For example, computer system 100 could be created, maintained, supported, and/or deployed by a service provider that offers the functions described herein for customers. That is, a service provider could be used to display message genealogy in the language of the user interface of an email recipient using a normalized set of subject prefix codes, as describe above. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for displaying a message genealogy of electronic mail (email), comprising:
    sending an email to a recipient, wherein the email has a subject;
    sending a normalized code in a header of the email corresponding to a subject prefix for the email to the recipient, wherein the normalized code is sent with the email as a separate entity;
    receiving the normalized code and the email at the recipient;
    examining the email header for the normalized code representing the subject prefix of the email;
    if the normalized code is found in the email header, removing the normalized code from the subject of the email;
    decoding the normalized code at the recipient to provide a subject prefix in a language of a user interface of the recipient; and
    displaying the subject prefix in the language of the user interface of the recipient adjacent the subject of the email.

2. The method of claim 1, further comprising:
    a look-up table at the recipient, wherein the look-up table comprises a plurality of subject prefixes in at least one language, and wherein the normalized code is decoded using the look-up table.

3. The method of claim 1, further comprising:
    choosing the language in which the subject prefix is displayed at the recipient.

4. The method of claim 1, wherein the subject prefix of the email corresponds to a message type selected from the group consisting of a reply email, a forwarded email, and an original email.

5. A system for displaying a message genealogy of electronic mail (email), comprising:
    at least one computing device including:
    a system for sending an email to a recipient, wherein the email has a subject;
    a system for sending a normalized code in a header of the email corresponding to a subject prefix for the email to the recipient, wherein the normalized code is sent with the email as a separate entity;
    a system for receiving the normalized code and the email at the recipient
    a system for examining the email header for the normalized code representing the subject prefix of the email, and if the normalized code is found in the email header, removing the normalized code from the subject of the email;
    a system for decoding the normalized code at the recipient to provide a subject prefix in a language of a user interface of the recipient; and a system for displaying the subject prefix in the language of the user interface of the recipient adjacent the subject of the email.

6. The system of claim 5, further comprising:

a look-up table at the recipient, wherein the look-up table comprises a plurality of subject prefixes in at least one language, and wherein the normalized code is decoded using the look-up table.

7. The system of claim 5, further comprising:

a system for choosing the language in which the subject prefix is displayed at the recipient.

8. The system of claim 5, wherein the subject prefix of the email corresponds to a message type selected from the group consisting of a reply email, a forwarded email, and an original email.

9. A program product stored on a recordable medium, which when executed, displays a message genealogy of electronic mail, the program product comprising program code for:

sending an email to a recipient, wherein the email has a subject;

sending a normalized code in a header of the email corresponding to a subject prefix for the email to the recipient, wherein the normalized code is sent with the email as a separate entity;

receiving the normalized code and the email at the recipient;

examining the email header for the normalized code representing the subject prefix of the email and, if the normalized code is found in the email header, removing the normalized code from the subject of the email;

decoding the normalized code at the recipient to provide a subject prefix in a language of a user interface of the recipient; and displaying the subject prefix in the language of the user interface of the recipient adjacent the subject of the email.

10. The program product of claim 9, further comprising:

a look-up table at the recipient, wherein the look-up table comprises a plurality of subject prefixes in at least one language, and wherein the normalized code is decoded using the look-up table.

11. The program product of claim 9, further comprising program code for:

choosing the language in which the subject prefix is displayed at the recipient.

12. The program product of claim 9, wherein the subject prefix of the email corresponds to a message type selected from the group consisting of a reply email, a forwarded email, and an original email.

* * * * *